United States Patent [19]

Cappos et al.

[11] Patent Number: 4,553,322

[45] Date of Patent: Nov. 19, 1985

[54] FLOATING LOCATOR HEAD FOR APPLICATION TOOLING

[75] Inventors: David J. Cappos, Middletown; Thomas M. Klunk, Dover, both of Pa.

[73] Assignee: AMP Incorporated, Harrisburg, Pa.

[21] Appl. No.: 610,946

[22] Filed: May 16, 1984

[51] Int. Cl.[4] .............. B23P 19/00

[52] U.S. Cl. .............. 29/739; 29/759

[58] Field of Search .............. 29/739, 741, 759, 747, 29/837, 838, 845

[56] References Cited

U.S. PATENT DOCUMENTS

| | | | |
|---|---|---|---|
| 3,665,378 | 5/1972 | Hammell et al. | 339/217 S |
| 3,893,217 | 7/1975 | Edmond | 29/407 |
| 4,186,982 | 2/1980 | Cobaugh et al. | 339/17 |
| 4,316,321 | 2/1982 | Wickham | 29/845 |
| 4,367,583 | 1/1983 | Baccei | 29/739 |
| 4,383,361 | 5/1983 | Kautz | 29/739 |
| 4,394,795 | 7/1983 | Goss | 29/739 |

OTHER PUBLICATIONS

Taylor, "Pre-Assembled Card-Edge Connectors for Faster Backplane Assembly," (AMP Incorporated, 1980; pp. 8, 7).

Rolex Company, "National Disc Springs", (1983), pp. 2, 18, 19.

*Primary Examiner*—Howard N. Goldberg

*Assistant Examiner*—Steven Nichols

*Attorney, Agent, or Firm*—Anton P. Ness; F. Brice Faller

[57] ABSTRACT

An apparatus is provided to enable a press to automatically apply an electrical connector to a printed circuit board. A locator block is secured to a floating pin holder plate which is mounted to a press ram, the connector is placed in position and partially inserted on the board and the board is secured and accurately disposed below the locator block. The locator block has a recess which surrounds the connector when the locator is lowered by the ram, urges the connector to the vertical and in turn urges the floating plate a slight but important two-dimensional horizontal increment to be precisely positioned and oriented with the connector. When the position of the locator block/floating plate assembly is thus adjusted, the locator block retracts exposing push pins mounted in the floating plate which enter cavities in the connector, engage the terminals therein, and push the terminals fully into plated through-holes of the board. A pre-load block/mounting plate assembly may be placed between the ram and the locator block/floating plate assembly, the pre-load block spaced an incremental distance from the mounting plate held apart by high spring force so that when the connector is fully mounted on the board, the springs compress and the pre-load block does not continue downward during the remainder of the ram's downstroke; and excessive ram force is prevented from being applied to the connector.

8 Claims, 9 Drawing Figures

FLOATING LOCATOR HEAD FOR APPLICATION TOOLING

FIELD OF THE INVENTION

The present invention relates to the application of electrical connectors to printed circuit boards, and more particularly to apparatus for the automatic application of connectors requiring high insertion force.

BACKGROUND OF THE INVENTION

Certain electrical connectors comprise a dielectric housing containing a plurality of closely spaced electrical contacts or terminals having posts extending outward parallel to each other to be inserted into corresponding through-holes of a printed circuit board. The through-holes are plated with an electrically conductive material so that an electrical connection is formed when the posts of terminals are inserted therethrough. It is desirable that the posts be held tightly in the through-holes, and the through-holes are dimensioned such that after plating thereof the posts must be wedged into the through-holes during insertion. For this purpose the posts are preferably square or rectangular having corners which "bite" into the plating material during insertion. U.S. Pat. No. 4,186,982 discloses additionally forming compliant contact sections along the posts which significantly enhances the mechanical strength of the engagement of the posts in the plated through-holes and their retention therein. Correspondingly, greater force is needed to push such posts into the through-holes.

In a connector having a plurality of such terminals, the force needed to insert all of the terminals into the array of through-holes is usually much greater than that which can economically be manually applied. For instance, if an average of twenty pounds or so per terminal is needed and, for instance, fifty terminals may be contained in the connector, a total force of one thousand pounds is required. The design of the connector housing most commonly is such that all terminals must be inserted simultaneously.

It is preferable for the force to be applied directly to the terminals individually rather than for the force to be applied to the housing, because application of the force to the housing may result in the terminals merely becoming dislodged from their respective cavities in the housing and only being partially inserted if at all into the printed circuit board. Further, it is preferable that the force be applied precisely vertically to push surfaces on the terminals and centered thereon, if applied by individual push pins of the application tooling of the apparatus; that the terminals be securely and precisely held in a vertical alignment normal to the surface of the board throughout the insertion procedure; and also that the board be securely and precisely held horizontally in the apparatus. Insertion tooling having push pins is disclosed in U.S. Pat. No. 4,394,795. Also, a mounting press having insertion tooling for connector application is disclosed in U.S. Pat. No. 4,367,583.

The printed circuit board typically has locating holes formed thereon related accurately to the position of the through-holes; using the locator holes, the board can be positioned in the applicator apparatus on locating pins of a holding fixture. While it is possible to secure the printed circuit board in a position such that the connector to be applied is located accurately beneath the applicator tooling of the apparatus, (when partially inserted on the board), it is common that the location and alignment of the arrays of through-holes of the board can vary from board to board within manufacturing tolerances in an amount substantial enough to frustrate previous attempts at automating the application process, because the push pins of the tooling are not centered on the push surfaces of the terminals precisely enough after the terminals are corrected to a true vertical. Such tolerance problems are accentuated when more than one connector is desired to be applied to a board at the same time.

Also, tolerance problems exist with respect to the vertical dimensions of the connector and board and in the application tooling and the press for which compensation should be provided by the apparatus in some manner.

Each connector housing must be mounted on the printed board such that its bottom or mounting surface is flush with the board surface of within a minute incremental distance therefrom to minimize or prevent debris or dust from entering, therebetween or to prevent accidental shorting by a metal object coming into electrical engagement with exposed portions of the contact terminals. Such precision mounting must be accomplished without applying excessive compressive force on the housing, yet enough must be applied to fully mount the connector. And where a plurality of connectors is to be mounted simultaneously by the same fixed downstroke of a reciprocal press ram having a fixed compression force, each connector may have a slightly different vertical dimension for which individual compensation must be provided by the application tooling.

SUMMARY OF THE INVENTION

The apparatus of the present invention provides for automated application of an electrical connector to a printed circuit board by fully inserting compliant contact sections of post portions of the terminals which extend normally from a bottom or mounting face of the connector, into plated through-holes of the board. The apparatus aligns the connector housing (already with post portions partially inserted into the board) to a truly vertical position, then aligns itself precisely with the housing so that the compression force may be applied directly to push surfaces of the terminal posts by respective push pins aligned therewith.

The apparatus of the present invention is comprised essentially of a locator block assembly and a floating body or plate. The floating plate holds push pins and is mounted beneath a reciprocable ram or compression head of a press and spaced a preselected distance therefrom, in a manner which allows limited two-dimensional horizontal. The locator block assembly, or locator, is affixed to and below the floating plate in a manner which allows lost motion, or limited guided movement in the vertical direction which is spring biased by compression springs, but essentially no movement (with respect to the floating plate) in the horizontal plane. The total locator/floating plate assembly is referred to herein as the floating locator head.

The locator has a large central recess in its bottom surface into which the connector housing enters when the locator is lowered over the housing. Having an enlarged lead-in portion, the recess is dimensioned to just fit over and around the particular housing of the connector which it is applying to the printed circuit board. During the downstroke of the press ram the connector housing becomes corrected to a vertical orientation relative to the apparatus and the floating locator head slightly repositions itself horizontally with respect to the position and orientation of the connector housing; and after the connector housing becomes fully seated in the locator recess, the locator is forced by the housing to retract allowing push pins secured in the floating plate to pass through cavities in the locator. The push pins then enter respective terminal-receiving cavities in the top or mating face of the connector housing where they engage push surfaces atop respective terminal posts contained in said housing cavities and apply the requisite compression force directly to the terminal posts to fully insert said posts into respective through-holes of the printed circuit board.

When the press ram begins its upstroke, the compression springs will urge the locator downward which will strip the housing from the push pins and act to hold down the housing and board.

In another aspect of the present invention there is means to compensate for vertical tolerances both of the total connector assembly including the board, the connector housing, the connector housing shroud (if one is used) and the terminals, and of the apparatus including the floating locator head, the press and the holding fixture. Assuming the reciprocal ram of the press (for instance, a hydraulic press) has a fixed stroke and a fixed total compression force exceeding that needed to insert a connector, a pre-load block assembly is mounted between the floating locator head of the present invention and the ram. A pre-load block is mounted a preselected incremental vertical distance from a mounting plate on the ram in a spring biased condition where the springs begin to compress further only at about the moment the connector is fully mounted on the board, the springs having a preselected pre-load strength equal to the maximum needed to insert the connector. In a single application of a plurality of connectors to a board, a separate pre-load block assembly may be used for each such connector, along with a separate locator.

DETAILED DESCRIPTION OF THE PREFERRED EMBODIMENT

Figure 1:
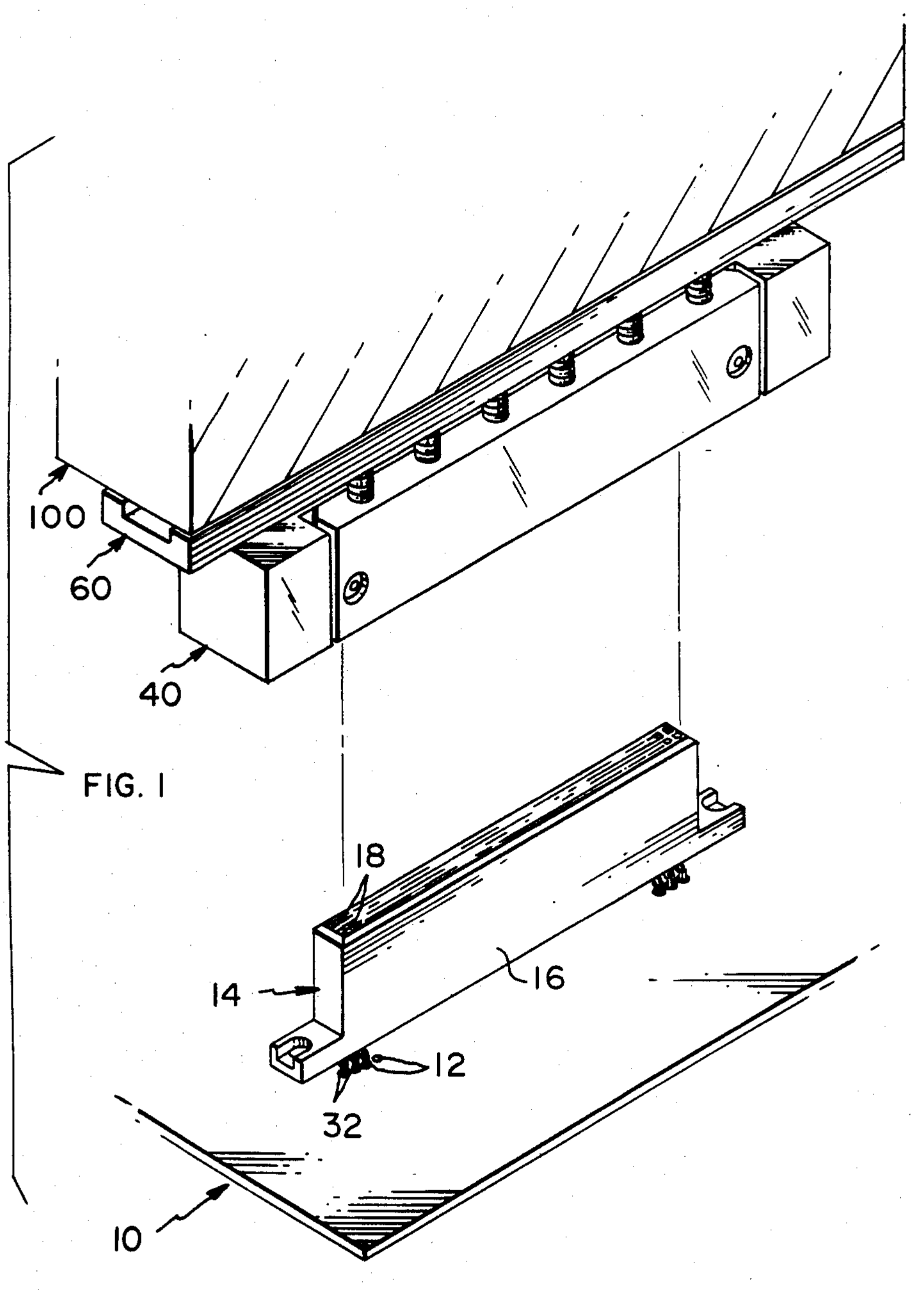
FIG. 1 is a perspective view of a connector placed on a board for full insertion by the floating locator head located thereabove.

According to the present invention, a floating locator head is provided for the automated insertion (application) of posts of a loaded electrical connector into through-holes of a printed circuit board which posts have compliant contact sections. FIG. 1 illustrates a connector 14 positioned on a printed circuit board 10 which is prepared for application by the apparatus of the present invention. A loaded connector housing assembly 14 comprising housing 16 containing terminals secured in terminal-receiving cavities 18 has been partially inserted on board 10 by means of pilot sections (not shown) of the terminals normally extending from housing 16 having been inserted into plated through-holes 12 of bord 10 which extend through board 10 from one surface thereof to the other. Compliant contact sections 32 of the post portions of the terminals remain above through-holes 12 awaiting insertion thereinto. The connector shown in FIG. 1 is a commercial two-row 60-post printed circuit board stackable box connector such as that sold by AMP Incorporated, Harrisburg, Penn. Above connector 14 is shown the locator block assembly 40 secured to floating body or plate 60 which in turn is mounted onto pre-load block 100 secured to a mounting plate on a tool holding end of a ram of a press (not shown).

Construction of the Invention

Figure 2:
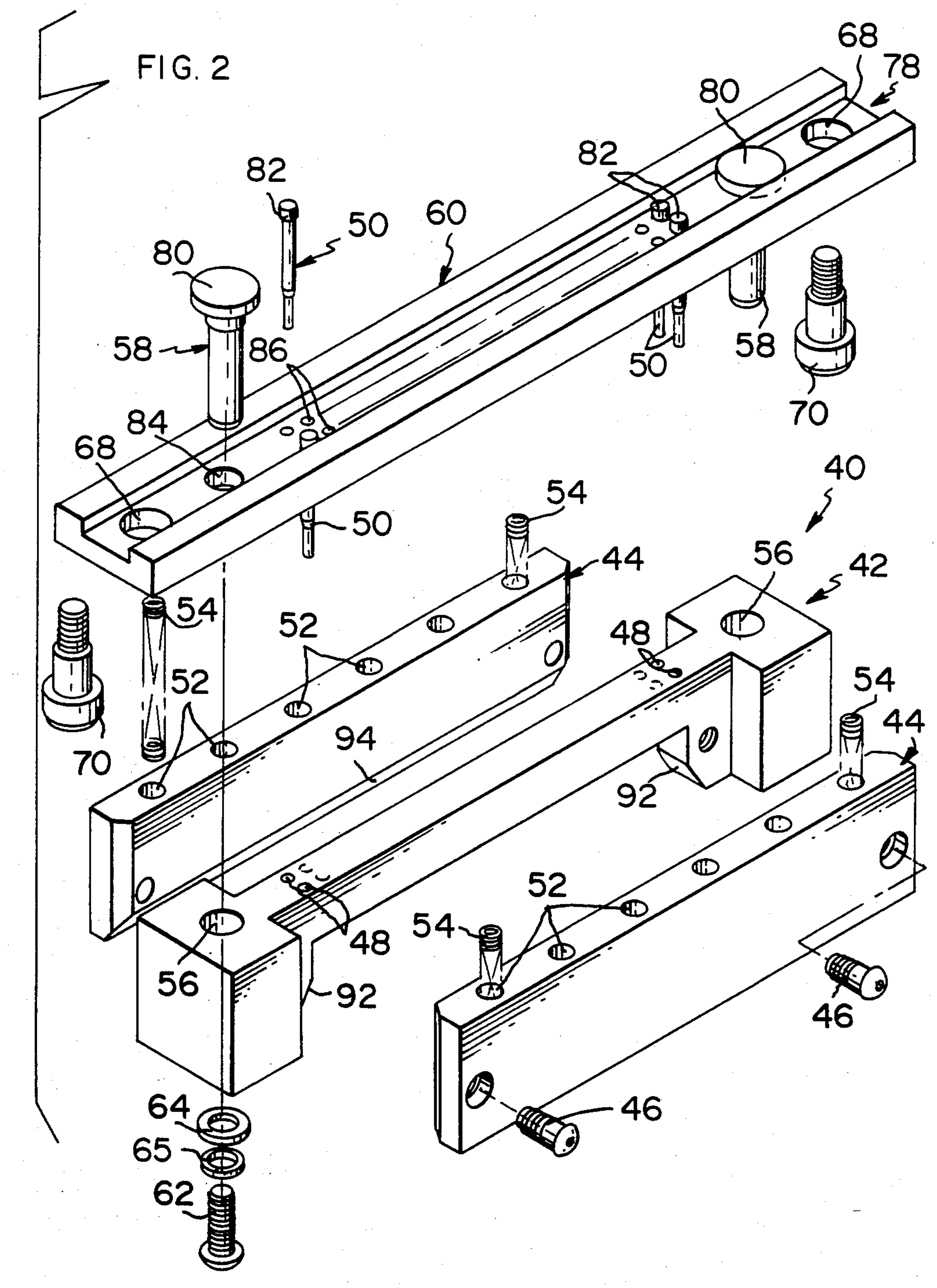
FIG. 2 is an exploded view of the locator block assembly and the floating plate.

As shown in FIG. 2, locator block assembly 40 is preferably comprised of a main locator plate 42 and two side plates 44 which are secured to sides of main locator plate 42 by fastening means such as screws 46. Main locator plate 42 has push-pin cavities 48 which extend vertically therethrough to receive push pins 50. Side plates 44 have spring cavity bores 52 which extend vertically thereinto from the top surfaces thereof, to receive bottom portions of compression springs 54. Main locator plate 42 has profiled guide pin bores 56 extending vertically therethrough at each end to receive guide pins 58 which extend vertically from floating plate 60. Guide pins 58 have threaded bores extending inward from bottom ends thereof to receive threaded fastening means 62 securely therein. As illustrated more clearly in FIG. 3, fastening means 62 includes means such as a flat washer 64 and a lock washer 65 placed between a head portion of fastening means 62 and the end of guide pin 58, and both washers 64, 65 and the head portion are disposed in an enlarged portion 66 of profiled guide pin bore 56 which extends into main locator plate 42 of locator 40 from a bottom surface thereof. Alternatively, a shoulder screw may be used to replace guide pin 58, fastening means 62 and washers 64 and 65, and hole 84 in floating plate 60 be threaded. The remaining portion of profiled guide pin bore 56 is just large enough for main body plate 42 to be vertically slidable along guide pins 58.

Floating body 60 has mounting holes 68 at ends thereof for bolt means preferably comprised of shoulder screws 70 extending upward therethrough and into mounting holes 102 in bottom surface 104 of pre-load block 100 to mount floating plate 60 onto pre-load block 100. Said shoulder screws should be precision machined so that shank shoulders 72 engage bottom surface 104 a precise distance from head shoulders 74 of enlarged head portions 76 of plate mounting means 70 equal to an amount larger than the height of floating plate 60 by a first incremental amount A. Thus, floating plate 60 rests on head shoulders 74 of plate mounting means 70 and is spaced a distance from pre-load block 100 equal to incremental amount A. Floating plate 60 has a longitudinal channel 78 extending centrally thereof; channel 78 is dimensioned to allow for and contain therein and therealong enlarged flat head portions 80 of guide pins 58, and enlarged flat head portions 82 of push pins 50, such that said head portions are just slightly spaced from bottom surface 104 of pre-load block 100. Guide pins 58 extend downward from heads 80 through guide pin cavities 84 of floating plate 60, into and through profiled guide pin bores 56 of locator 40 aligned therewith. Push pins 50 extend downward from heads 82 through push pin cavities 86 of floating plate 60 and into push-pin cavities 48 of locator 40 aligned therewith.

Spring cavity bores 88 extend vertically upward and into floating plate 60 from the bottom surface thereof, corresponding to and aligned with spring cavity bores 52 in side plates 44 of locator 40, and compression springs 54 are contained within associated bores 88, 52 between floating plate 60 and locator 40.

By means of springs 54 locator 40 is held in a normally extended position and is able to be moved to a retracted position to abut floating plate 60 because of resistance of connector 14 during insertion.

Figure 4:
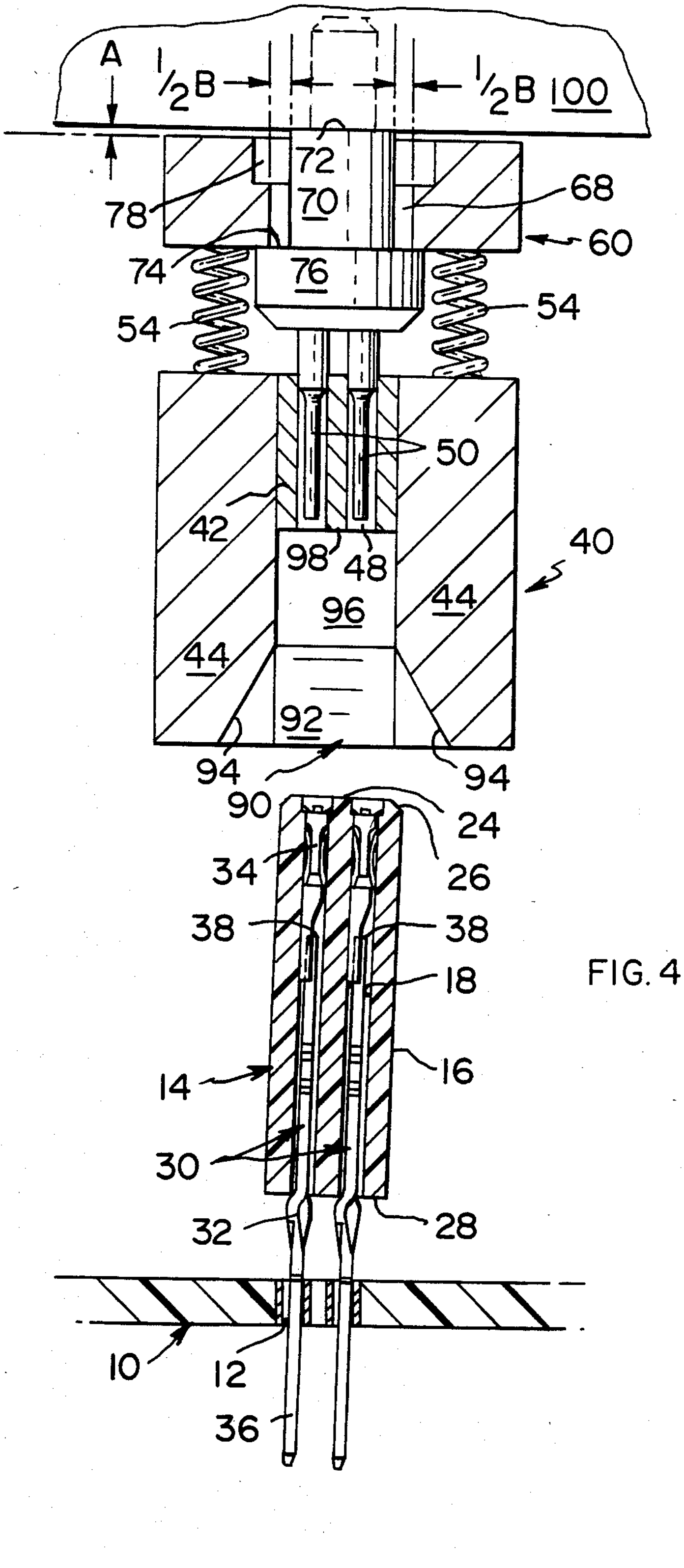
FIG. 4 is a cross-sectional view taken along line 4—4 of FIG. 3.

As can be seen in FIG. 4, mounting holes 68 are wider than the shank portions of screws 70 by a preselected second increment B but are not as wide as head shoulders 74 of mounting means 70. It is by means of mounting hole 68 having a diameter exceeding the diameter of the shank of plate mounting means 70 that floating plate 60 is permitted to "float" an incremental distance not exceeding B from one extreme to another horizontally in two dimensions, or an average of $\frac{1}{2}$ B from a centered position.

As shown in FIG. 4, when main locator plate 42 and side plates 44 are assembled to form locator 40 there is formed thereby in the bottom surface thereof a large connector locating recess 90 having a widened lead-in portion formed by end beveled lead-in surfaces 92 and side beveled lead-in surfaces 94. A deep seating channel 96 comprises the inner portion of recess 90, the top of which is formed by load surface 98. Load surface 98 has extending therethrough the bottom ends of push-pin cavities 48.

Figure 3:
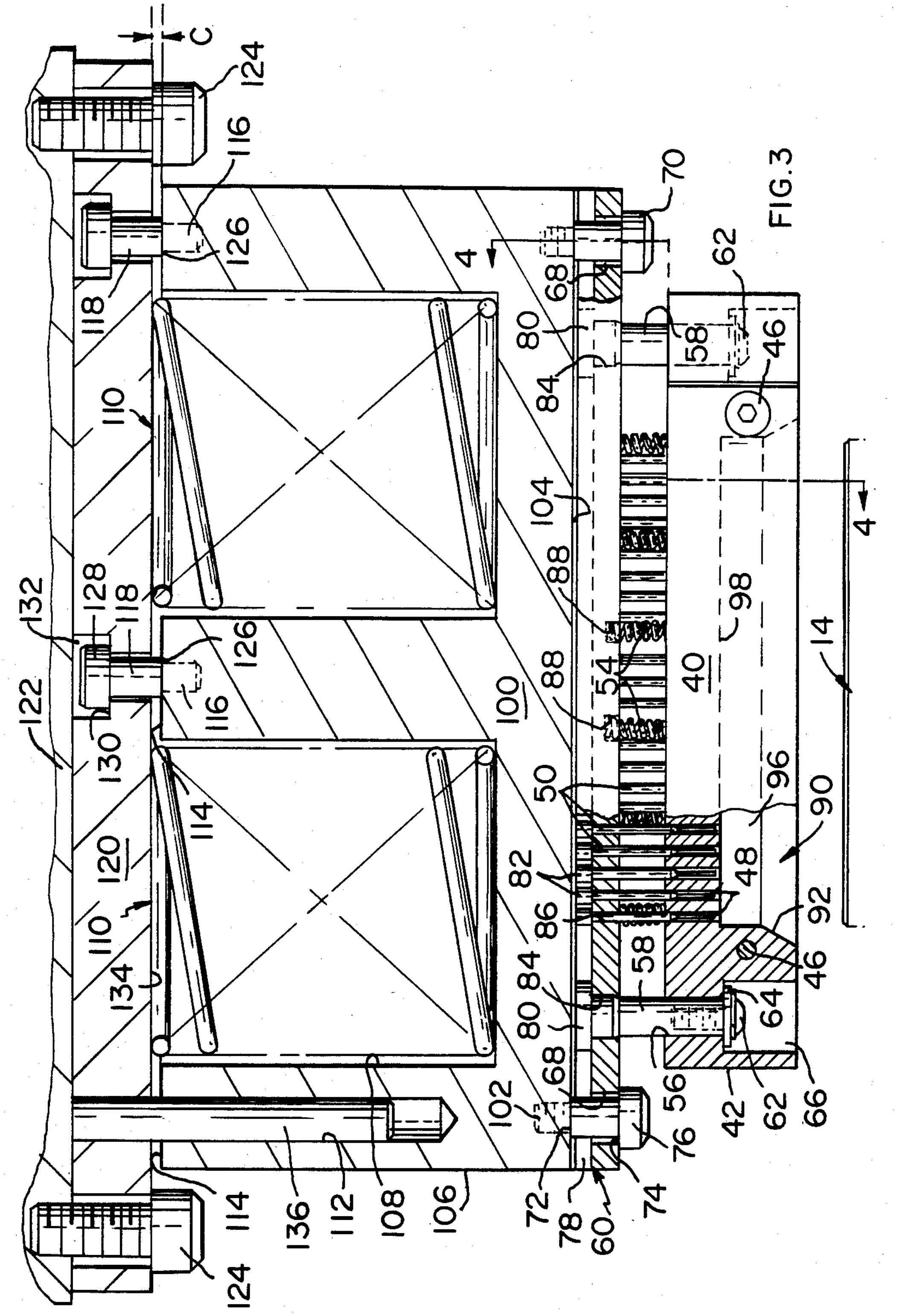
FIG. 3 is a longitudinal part section of the mounted floating locator head with a connector therebelow.

Referring to FIG. 3, pre-load block 100 has a body portion 106, compression spring cavities 108 containing high load compression springs 110, dowel pin cavity 112, and top surface 114 having threaded bores 116 thereinto for threadedly engaging top mouunting means 118 extending thereinto from mounting plate 120. Mounting plate 120 in turn is mounted by ram mounting means 124 abuttingly to a tool holding end of reciprocal compression head or ram 122 of a conventional press such as a hydraulic press (not shown) which moves downward in a fixed stroke to apply compressive force in an amount of (for instance) three tons, or ten tons, or some other amount greater than the requisite insertion force needed to insert connector 14 (or several thereof) into printed circuit board 10. Top mounting means 118 preferably are shoulder screws having shoulders 126 which engage top surface 114 around threaded bores 116, and having enlarged head portions 128 which engage stop shoulders 130 in profiled bores 132 through mounting plate 120 when top mounting means 118 are inserted through said profiled bores 132 from the top thereof. Top mounting means 118 are precision machined to a preselected length between enlarged head portion 128 and shoulders 126, which length exceeds by a third incremental amount C the distance between stop shoulders 130 and bottom surface 134 of mounting plate 120. When mounting plate 120 is mounted to pre-load block 100, pre-load block 100 is held a fixed distance C away from mounting plate 120. Long dowel pin 136 extends from mounting plate 120 vertically downward into dowel pin cavity 112 of pre-load block 100 to prevent horizontal movement of pre-load block 100 with respect to mounting plate 120, while permitting very limited vertical movement of pre-load block 100 with respect thereto.

Prior to being mounted onto the tool holding end of the ram, the pre-load block 100 has been mounted to the mounting plate 120 with high load compression springs 110 (shown as coil springs) abuttingly engaging bottom surface 134 of mounting plate 120. High load springs 110 have been selected to have such a spring rate and such a length and spring cavities 108 dimensioned to have such a depth, that springs 110 may be precompressed by mounting plate 120 between bottom surface 134 thereof and the bottom of spring cavities 108 when mounting pre-load block 100 thereto with incremental distance C therebetween, to result in a preselected preload strength of the pre-load block/mounting plate assembly (referred to as pre-load assembly 100, 120) which for each type of connector desired to be applied is that total compressive force needed to properly apply said connector into the printed circuit board. Optionally, disc or belleville springs may be used instead of coil springs 110, in a similar manner but which are smaller, taking up less space and allowing pre-load assembly 100, 120 to be correspondingly smaller to permit more pre-load assemblies to be mounted on ram 122 to apply more connectors 14 to a board 10.

As shown in FIG. 4, contact terminals 30 have been inserted into terminal-receiving cavities 18 of housing 16. In the example illustrated herein, connector 14 is of a stackable box type, although other kinds of connectors may be used in the practice of the present invention. Also in the example illustrated herein, terminals 30 are box type terminals having upper, box portions 34 and lower, post portions or posts 36 which two portions are welded together. Posts 36 have a square cross-section. Box portions 34 have a structure similar to that disclosed in U. S. Pat. No. 3,665,378 wherein a receptacle is formed to receive square posts of other terminals of the same structure; resilient fingers along the sides thereof electrically and mechanically engage sides of posts inserted therein. With such a structure the terminals are said to be stackable, and housings having appropriate structures containing such terminals are said to be stackable. Terminals 30 illustrated herein have four such resilient fingers in box portions 34.

Intermediate normally extending pilot portions of posts 36 and portions held within housing 16 are compliant contact portions 32 which are similar to those disclosed in U. S. Pat. No. 4,186,982. It is compliant contact portions 32 which require substantial compressive force to be inserted into plated through-holes 12 of printed circuit board 10 for electrical and mechanical engagement with board 10. On sides of posts 36 within cavities 18 of housing 16 are barb-like projections (not shown) which projections tightly hold terminals 30 within cavities 18 after insertion thereinto, during assembly of connector 14. Cavities 18 are enlarged at top portions thereof to contain box portion 34 of terminals 30. Top surface or mating face 24 of housing 16 preferably has beveled edges 26.

Also, terminals 30 have push surfaces 38 which are the flat tops of post portions 36 of terminals 30 and which are engaged by push pins 50 during insertion of connector 14 into board 10. Box portions 34 of terminals 30 form channels such that push pins 50 may pass therethrough to reach push surfaces 38 and apply the compression force onto posts 36. Push pins 50 are of such a length that the bottoms thereof pass completely through cavities 48 of main body plate 42 (when locator 40 is compressed against floating plate 60), enter terminal-receiving cavities 18 of housing 16 and into box portions 34, reach push surfaces 38 of terminals 30 and push posts 36 further into through-holes 12 of printed circuit board 10 until compliant contact sections 32 are fully inserted into through-holes 12.

Operation of the Invention

Figure 5:
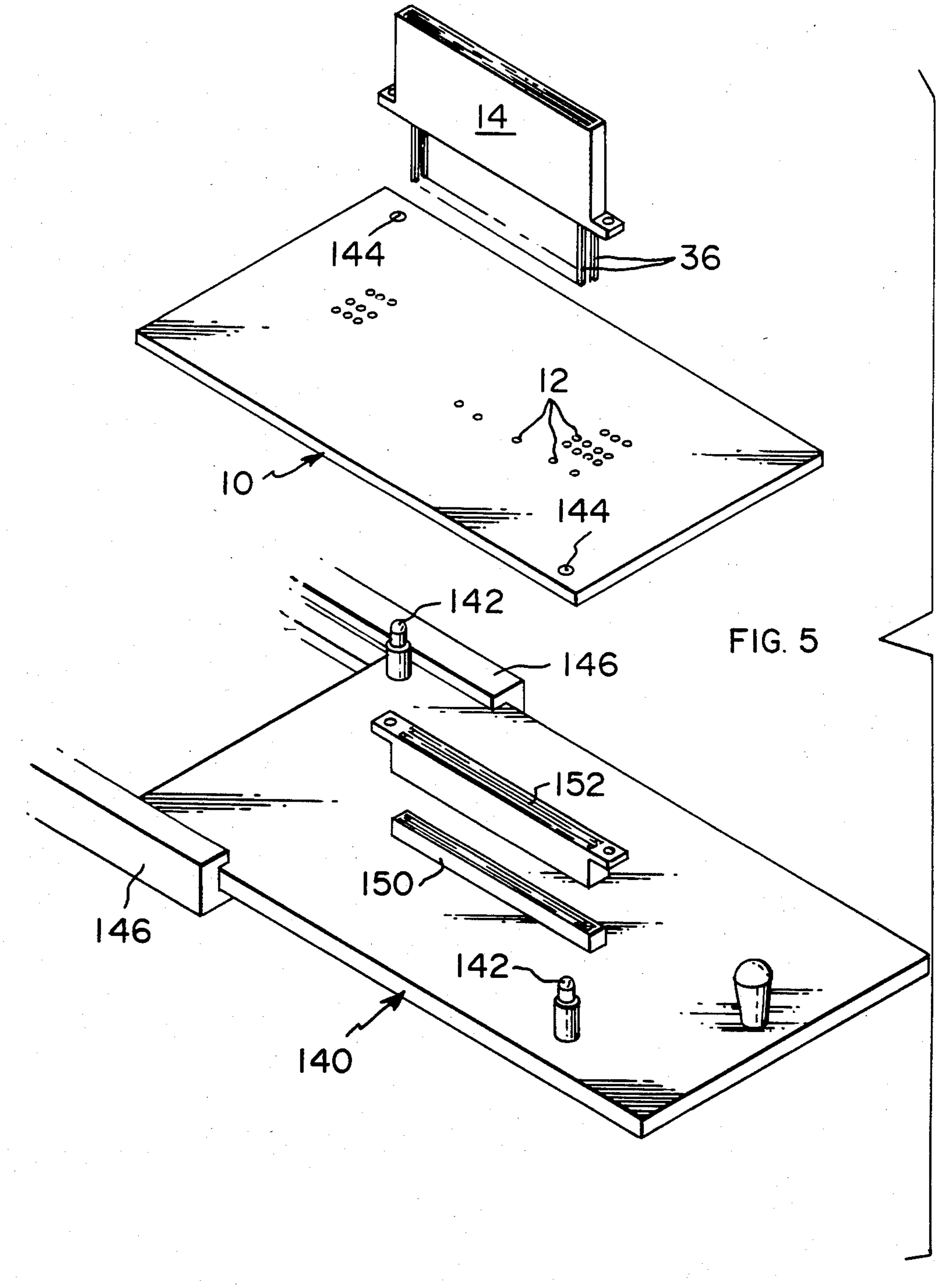
FIG. 5 is an exploded view of the board holding fixture and a board and connector thereabove.

Prior to the application of compressive force by the compression head of the press, connector 14 has been already loaded with terminals 30 and has been partially mounted on the printed circuit board 10 with pilot sections of posts 36 of terminals 30 normally extending from mounting face 28 of housing 16 partially inserted into their associated plated through-holes 12 of board 10. Referring to FIG. 5, the printed circuit board 10 is securable in position in board holding fixture 140 by locating means 142, such as pins extending upwardly through locating holes 144 in board 10. Positioning is accomplished by forming locating holes 144 in board 10 located as accurately as possible with respect to the array of through-holes 12. Connector assembly 14 will thereby be positioned as closely as practicable under floating locator head 40, 60 mounted on the press in a correspondingly precise manner to locating means 142.

Board holding fixture 140 may be movable along a track means 146, so that board 10 may be placed on fixture 140 remote from the applicator apparatus and then be slid along track means 146 into position beneath floating locator head 40, 60. A sensor means (not shown) senses when fixture 140 has been properly positioned and permits the press then to operate. Such a sensor may consist of an electrical circuit which if not completed would cause the press ram not to operate. An additional device to mechanically assure proper location of the fixture 140 may consist of, for example, a precisely positioned stop for holding fixture 140 and a horizontally disposed ring on said holding fixture 140 having beveled leadins through with a vertical rod having beveled edges mounted on press ram 122 enters during the downstroke before a locator 40 reaches a connector 14 and may slightly correct the position of the holding fixture.

Figure 6:
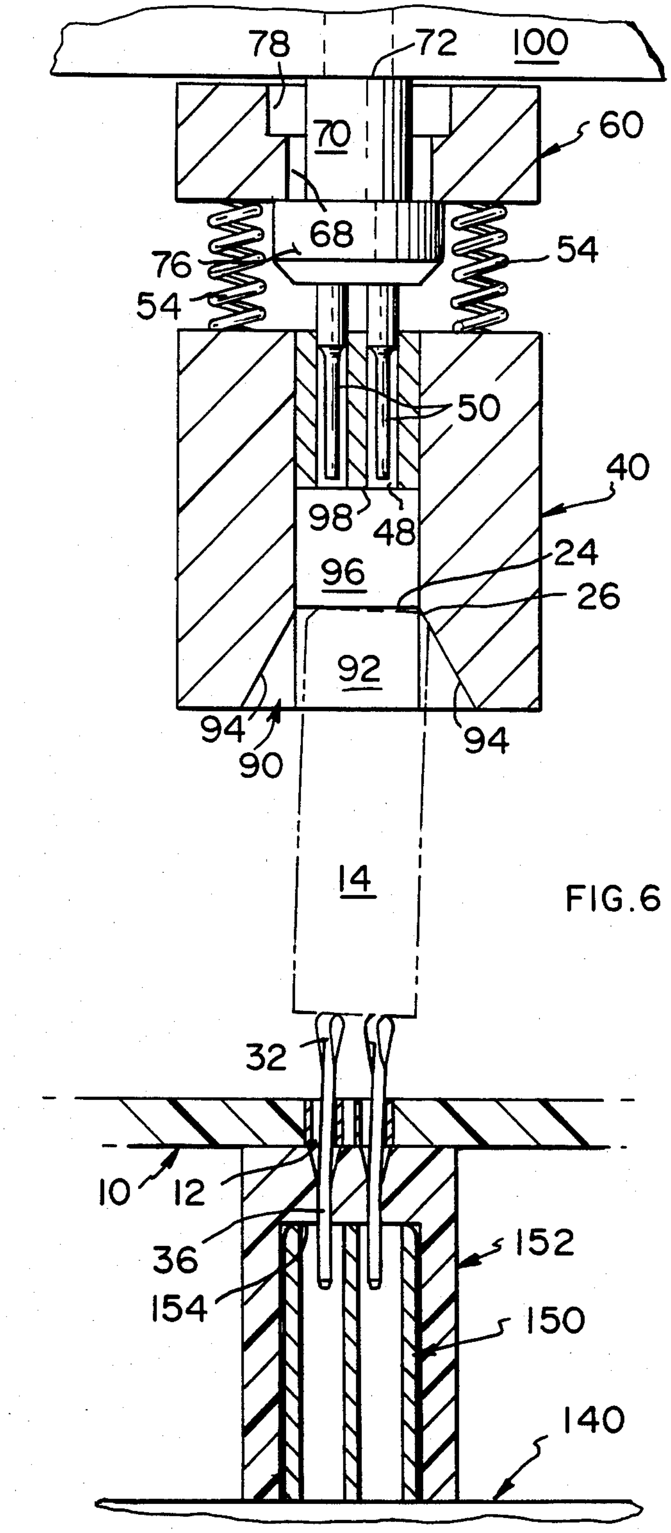
FIG. 6 is the cross-sectional view of FIG. 4 showing a housing in phantom entering the recess slightly out-of-vertical.

Raised support 150 is precisely located on fixture 140 to provide support for board 10 immediately beneath the area of through-holes 12. If a connector housing shroud 152 is desired to be applied beneath board 10 during the application of connector 14 to board 10, such as illustrated in FIGS. 5 and 6, raised support 150 is to be dimensioned such that housing shroud 152 is not tightly engaged thereby but is slightly movable thereon horizontally to adapt to pilot portions of terminal posts 36 inserted thereinto when board 10 with connector 14 partially inserted thereon having post pilot portions extending therethrough, is placed thereon prior to full insertion. If no connector housing shroud 152 is to be applied during the automatic application procedure, raised support is dimmensioned to engage printed circuit board 10 directly therebeneath.

Housing shroud 152 has corresponding post-receiving cavities therethrough to tightly receive post portions 36 of terminals 30. Housing shroud 152 is dimensioned to mate with housing 16 such that they are stackable. Board 10 is not supported other than by support 150 (with housing shroud 152 thereon if used) and shoulders of locating means 142 to avoid damaging circuits on board 10. Board holding fixture 140 is precisely dimensioned to assist in positioning board 10 and connector 14 within the applicator apparatus.

The compressive or insertion force must be applied directly to the push surface 38 of each metal post 36 individually and not primarily to plastic dielectric connector housing 16; this must be done using push pins 50 which enter the individual terminal-receiving cavities 18 in the top of housing 16 and engage push surfaces 38 of posts 36 of the individual terminals 30. It is critical that, before a substantial amount of insertion force is being applied, each push pin 50 must be seated accurately atop each push surface 38, and each post 36 must be truly vertical with respect to the applicator apparatus of the invention. Thus, the connector assembly 14 must be securely held in vertical alignment for the duration of the application. If this is not the case, connector assembly 14, printed circuit board 10 and/or the application tooling may be damaged by the thousands of pounds pressure applied by the press.

The floating locator head 40, 60 of the present invention is lowered to the connector assembly 14. As shown in FIG. 6, connector assembly 14 may be tilted a slight amount by reason of posts 36 being only partially inserted into through-holes 12 of board 10. As mating face 24 of housing 16 enters large recess 90 of locator 40, edges of housing 16 (preferably beveled as at 26) will engage at least one of lead-in surfaces 94, 92. Floating locator head 40, 60 is being lowered slowly enough that housing 16 will slide along the lead-in surfaces 92, 94 of large recess 90 and be urged into a truly vertical position with respect to the apparatus. As housing 16 enters the deeper extent of recess 90 it becomes vertical by being very closely engaged by deep seating channel 96 having the same length and width as the housing (plus very small tolerances), and the connector assembly 14 is held to a true vertical in the applicator apparatus.

However, for automatic insertion to be practical it is not sufficient just to have housing 16 in a vertical position. It is necessary that push pins 50 become and remain precisely aligned with posts 36 and centered on push surfaces 38 thereof during the insertion procedure. Since printed circuit board 10 is secured against movement, connector assembly 14 is secured against horizontal adjustment will respect to board 10 by reason of posts 36 engaged in through-holes 12 floating locator head 40, 60 must have a means to precisely and continuously correct its position and alignment upon being urged by the housing 16 of connector assembly 14.

Figure 9:
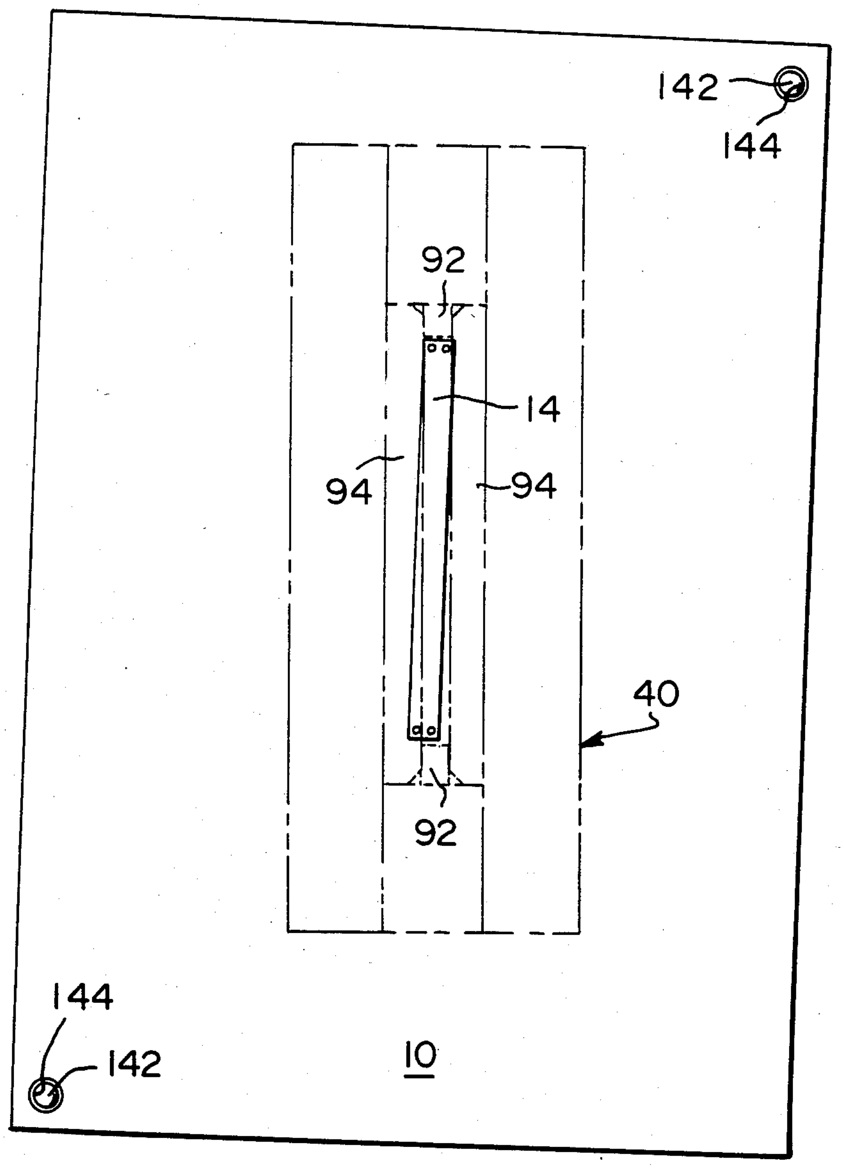
FIG. 9 is a plan view of the board and connector with an unaligned floating locator head outlined in phantom.

The floating locator head of the present invention consisting of the locator block assembly 40 and the floating plate 60 compensates for reasonable, slight variations from such exactly precise alignment which may result from manufacturing tolerances for printed circuit board 10 wherein the arrays of through-holes 12 may vary very slightly in distance and alignment from holes 144 formed in the board (such as is diagrammed in FIG. 9). Another substantial contributor to misalignment may be variations in the diameters of locating holes 144. Connector assembly 14, with posts 36 partially inserted in through-holes 12, correspondingly varies in distance from locating holes 144 of board 10 and may also be slightly out-of-alignment therewith. Thus when locating holes 144 of board 10 are used to locate the board (and thus the connector) in the apparatus used to apply the insertion force, misalignment occurs.

This misalignment problem is far more acute when a plurality of connectors is desired to be applied to a board simultaneously, by the same stroke of the press ram. The arrays of through-holes may vary between each other in distance and alignment. Separately floating locator/floating plate assemblies 40, 60 will resolve this problem.

The floating locator head of the present invention "floats" horizontally in two dimensions to a slight degree even allowing very slight rotational movement due to the manner in which floating plate 60 is mounted to pre-load block 100. Because of the manner in which locator block assembly 40 is secured to floating plate 60, locator 40 is permitted upward vertical lost motion which is resisted by compression springs 54; but locator 40 is restrained against any horizontal movement with respect to floating plate 60 by reason of guide pins 58 and push pins 50. Locator 40 does move along with floating plate 60 horizontally with respect to pre-load block 100 when floating plate 60 is urged to move.

Figure 7:
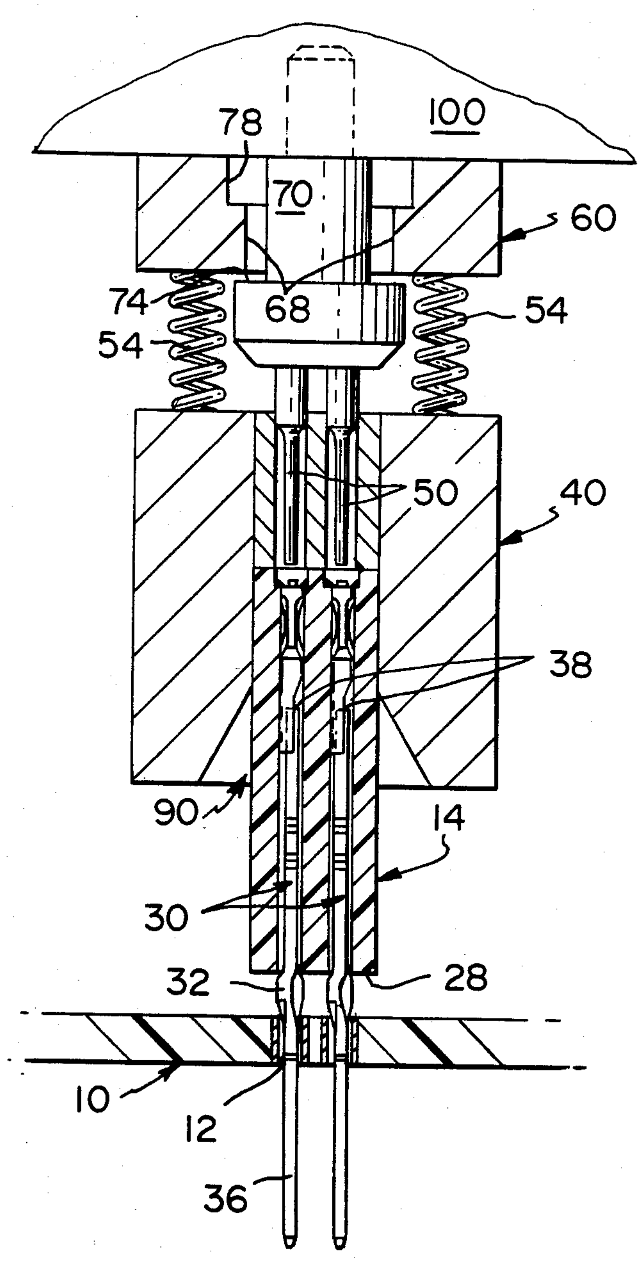
FIG. 7 is the cross-sectional view of FIGS. 4 and 6 showing the housing fully seated in the locator prior to retraction of the locator.
Figure 8:
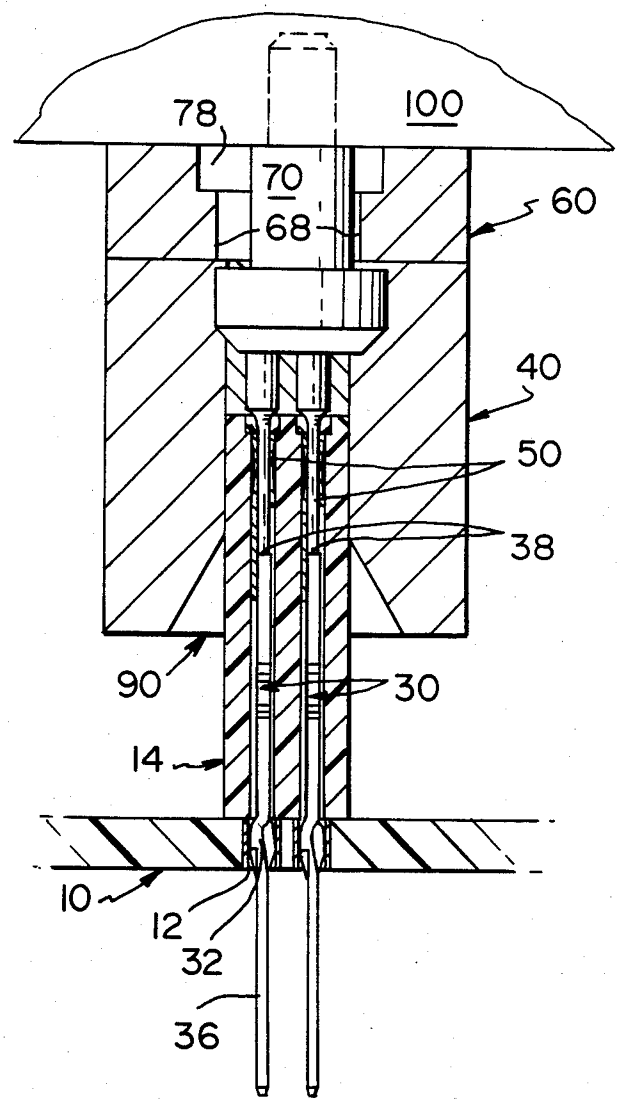
FIG. 8 is similar to FIG. 7 after the posts have just been inserted into the board, and where the floating locator head has indexed itself to the left to align with a housing disposed a slight distance to the left of the relative center of the floating locator head.

FIG. 7 illustrates the ideal case where no correcting horizontal movement by the floating locator head is required because push pins 50 are aligned with and centered on push surfaces 38, and posts 36 are centered with respect to through-holes 12, after connector assembly 14 is fully seated into deep seating channel 96 of large recess 90. Compressive force may now be appropriately applied by the press ram through pre-load block 100. The compliant contact sections 32 of posts 36 will be inserted into through-holes 12 by reason of push pins 50 applying the requisite insertion force on push surfaces 38, as seen in the lower portion of FIG. 8. (Push pins 50 are moved upward a minute distance until enlarged flat head portions 82 are engaged by bottom surface 104 of pre-load block 100.)

But for exactly precise alignment of push pins 50, posts 36 and through-holes 12, some limited horizontal adjusting of the floating locator head 40, 60 will usually be necessary from its previous applicating orientation. Such adjustment occurs mostly after housing 16 enters deep seating channel 96 of recess 90 of locator 40 but before compressive force is applied. As housing 16 is urged to the vertical and posts 36 already firmly engage sides of through-holes 12, housing 16 will urge locator 40 by acting as a lever in a direction opposite where posts 36 engage sides of through-holes 12. Then when housing 16 is fully seated in recess 90 and pre-load block 100 applies compressive force to floating plate 60 which becomes compressed against locator 40, push pins 50 enter terminal-receiving cavities 18 of housing 16 and into box portions 34 of terminals 30 until engaging push surfaces 38, and begin to insert compliant contact sections 32 fully into through-holes 12. Minor floating of floating locator head 40, 60 may still occur as compliant contact sections 32 become centered in through-holes 12 and urge connector assembly 14 and hence locator 40 in the necessary direction. As shown in the upper portion of FIG. 8, floating of the floating locator head 40, 60 has occured to an extent not exceeding the preselected increment B in mounting hole 68 of floating plate 60, and full insertion has occured.

Compliant contact sections 32 are now fully inserted into through-holes 12 of printed circuit board 10 where they will be securely held in electrical engagement with the conductive material on the inside surfaces of the through-holes.

The floating locator head does not apply a substantial portion of the compressive force to the housing 16 until compliant contact sections 32 of terminals 30 are fully inserted. Housing 16 will become secured to the printed circuit board by reason of the tight securing of terminals 30 within terminal-receiving cavities 18, which terminals 30 are also tightly secured at their compliant contact sections 32 by board 10.

When compliant contact sections 32 are fully inserted into through-holes 12, mounting face 28 of housing 16 ideally reaches and stops on the top face of board 10. Since mating face 24 of housing 16 is already in engagement with load surface 98 of large recess 90, substantial compressive force is immediately applied by floating locator head 40, 60 onto housing 16. In a typical press usable in applying connectors to boards, the reciprocal compression ram is designed to travel a fixed distance downward during the application of a fixed amount of compressive force, which fixed distance and force is not able to be economically varied from connector to connector. Referring to FIG. 5, it can be seen that beginning with raised support 150 there is housing shroud 152, board 10 with plating material at and in each through-hole 12, terminals 30, and connector housing 16, all of which have manufacturing tolerances associated therewith related to their vertical dimension, which collectively will vary from connector to connector the total distance between shroud mating surface 154 and mating face 24 of housing 16. In addition, compensation is desirable for tolerances from the tooling, holding fixture and press ram elements of the apparatus.

The fixed traveling distance for the press ram 122 is preselected to give full insertion of terminals without crushing the housing or damaging the board by traveling too far, when all vertical dimensions of the elements of the connector/board assembly are at their minimum within manufacturing tolerances and the buildup of tolerances in the tooling and apparatus effects the greatest distance between the top surface of raised support 150 and load surface 98 of locator 40. Successfulcompensation for tolerances is achieved by pre-load block 100 and its manner of mounting on mounting plate 120 with incremental distance C therebetween and high load compression springs 110, as shown in FIG. 3. Pre-load assembly 100, 120 is arranged to have a total preload strength equal to that estimated to be needed to properly insert the connector on the board, plus a limited amount more being permissible. When compliant contact sections 32 of posts 36 are fully inserted, and mounting face 28 of housing 16 engages board 10, mating face 24 of housing 16 begins to substantially resist compression by load surface 98 of locator 40, and preload assembly 100, 120 begins to "see" more resistance than that given by posts 36 to push pins 50; and when the total resistance "seen" exceeds the pre-load strength, high load compression springs 110 begin to compress as press ram 122 continues to move downward (until it reaches its fixed traveling distance), but pre-load block 100 does not continue to travel along with compression ram 122. Instead, it begins to close the gap between itself and bottom surface 134 of mounting plate 120, which is incremental distance C. Incremental distance C, it now can be seen, is selected to exceed the collective maximum manufacturing tolerances of the elements of the connector/board assembly and the elements of the tooling and apparatus. When the fixed traveling distance for the compression ram 122 and the incremental distance C are properly selected and the appropriate pre-load strength of pre-load assembly 100, 120 arranged, successful, complete and ecomomical application of a connector to a printed circuit board may be obtained in an automatic application process, especially when used with floating locator head 40, 60. Pre-load assembly 100, 120 can be relied upon to allow compensation for designed overtravel of a press ram to assure full insertion of a connector especially in an application of a plurality of connectors in an automated application thereof.

FIG. 9 illustrates diagrammatically an exaggeration of a connector housing on a board prior to full insertion. An outline of floating locator head 40, 60 is shown before any floating thereby has occured, with beveled lead-in surfaces 92, 94 denoted. Connector 14 is vertical, but is not parallel with locator 40. As connector 14 enters the large recess of locator 40, locator 40 (affixed to floating plate 60) will rotate slightly clockwise and move slightly to the left to align itself with connector 14.

The floating locator head of the present invention may be useful with other connectors with locator blocks formed to be adapted to the connector selected, but the present invention is especially useful where such precise alignment of the tooling with the work piece is required such as where push pins are essential. Other means may be used to provide the "floating" capability of the floating plate of the present invention and be within the scope of the invention, such as using air bearings and a spring bias between the plate and the tool holding end of the ram, or the pre-load block, or using "friction-less" surfaces and a spring bias without an incremental distance.

The pre-load assembly of the present invention may be useful separately from the floating locator head of the present invention, and may be useful not only with other types of connectors and different application tooling therefor but also with different workpieces altogether.

We claim:

1. A connector insertion tool for mounting to a ram and mass inserting a plurality of posts depending from a connector into a printed circuit board, said tool comprising a body having a top surface and an opposed bottom surface, push-pins extending from said bottom surface, locator slidably mounted on fingers, and spring means effective to urge said locator means away from said body, a recess in the locator means which closely receives the connector therein, the tool further having floatable mounting means to permit lateral float of the tool relative to the ram during the downstroke thereof.

2. A tool as in claim 1 wherein the floatable mounting means comprises bolt means having a head adjacent the bottom surface of the body, the shank passing upward through a bore in the body, the shank being laterally fixed relative to the ram, the diameter of the bore being larger than the diameter of the shank.

3. A tool as in claim 1 further comprising a preload block to which said bolt means is fixed, said preload block being fixed laterally relative to said ram.

4. A tool as in claim 3 wherein said preload block is slidably mounted to said ram for vertical movement relative thereto, said preload block being urged away from said ram by spring means.

5. A tool as in claim 3 wherein said body is mounted for vertical movement relative to said preload block.

6. A tool as in claim 1 wherein said body is mounted for vertical movement relative to said ram.

7. A tool as in claim 1 wherein said guide means has a chamfered lead-in to said recess therein.

8. A tool as in claim 1 wherein said bolt means comprises a shoulder screw having a shoulder a fixed distance from said head, said distance being greater than the height of said body.

* * * * *